Nov. 30, 1943.  A. H. PENDERGRAST ET AL  2,335,308
CORK EXTRUSION APPARATUS
Filed Feb. 1, 1940
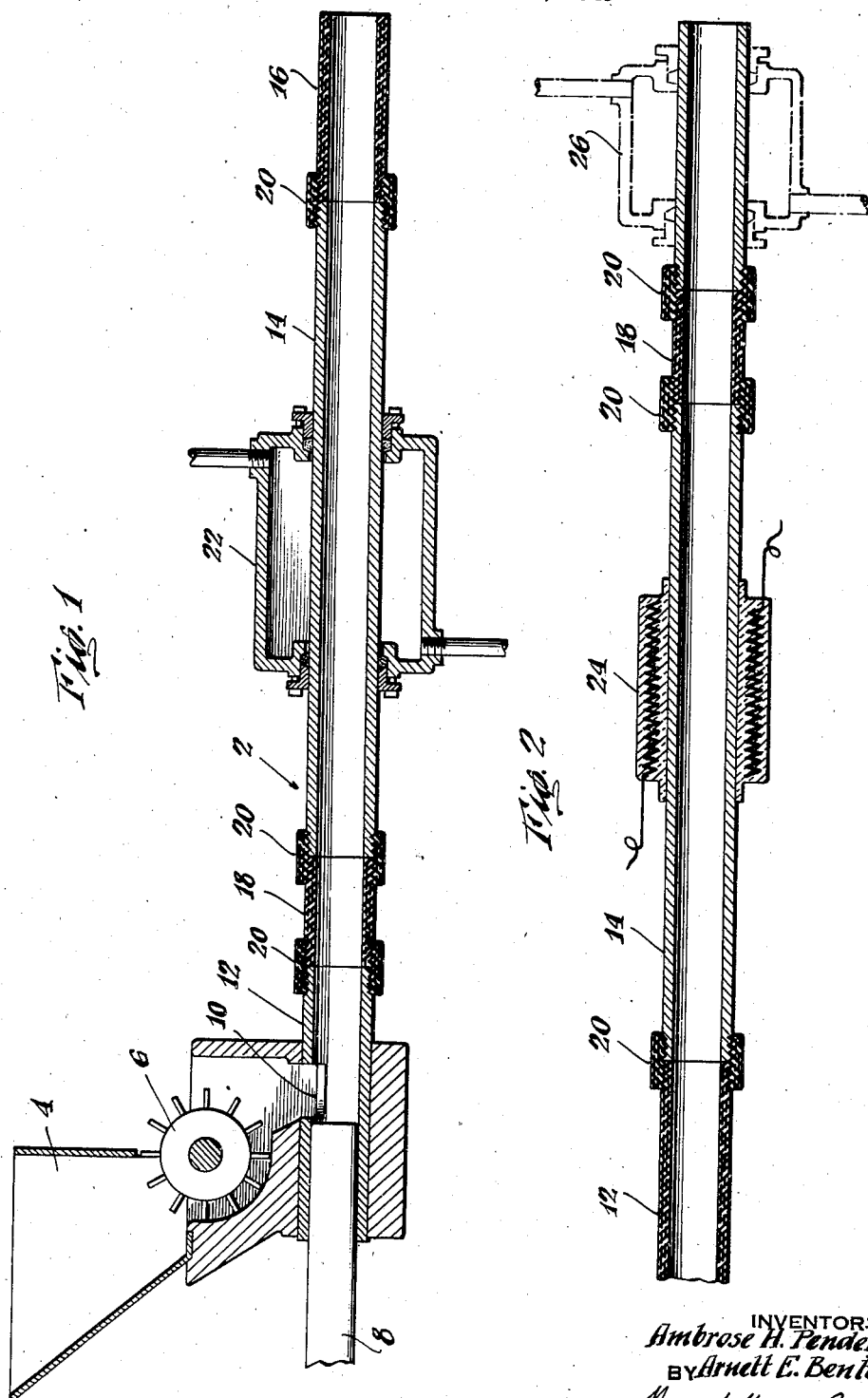
INVENTORS
Ambrose H. Pendergrast
BY Arnett E. Benton
Marquet, Meary & Campbell
ATTORNEYS Patented Nov. 30, 1943

2,335,308

UNITED STATES PATENT OFFICE 2,335,308

CORK EXTRUSION APPARATUS

Ambrose H. Pendergrast and Arnett E. Benton, Wilmington, Del., assignors to Bond Manufacturing Corporation, Inc., a corporation of Delaware Application February 1, 1940, Serial No. 316,722

11 Claims. (Cl. 18—12)

This invention relates to an improvement in apparatus for extruding composition cork and similar products.

It is customary in the practice of the extrusion process of making composition cork to force an admixture of comminuted cork and an adhesive or binder through a tube or die of suitable shape adapted to impart the desired form to the extruded body. In the course of travel of the material through the forming tube or die it is subjected to the action of heat and pressure serving to "set off" or bring about chemical changes in the binder to render it insoluble and infusible.

Among the other characteristics that it is desired to maintain or impart to the composition cork, tensile strength, both wet and dry, is important because tensile strength is a measure of the ability of the composition cork to function effectively for many of the uses to which it is put, such, for example, as sealing disks for crown caps, gaskets, expansion joints in concrete roadways, etc. One of the important factors which influence the tensile strength of an extruded composition cork bar is the amount of heat treatment or curing given to the cork.

With the apparatus heretofore used and as the process has heretofore been conducted, the conditions inherent in the operation have been such as to impose various limitations on the extent and degree of the heat treatment that may be imparted to the cork in its passage through the extrusion tube. Some of these limitations may be overcome or to a certain extent removed by utilizing an extrusion apparatus embodying the invention disclosed in application filed of even date herewith, Serial No. 316,721, by Ambrose H. Pendergrast, one of the inventors named herein. By applying the invention of the aforesaid application it is made possible to use a higher hot jacket temperature in the heating section, and, at the same time, lengthen the heating and curing tube section because the higher temperature in the heating and curing zones decreases the friction of the composition cork on the tube walls. While this is an advantage in that it permits of a greater heat input in the heating and curing section and increases the extent of curing, it is nevertheless necessary to maintain the temperature in the heating zone low enough to insure that the cork as it exits from the end of the tube is sufficiently cooled to retain its shape and not swell unduly.

The present invention is based upon the applicants' discovery that marked and unexpected improvements may be obtained by introducing a tube or other section of low heat conductivity and of substantially the same inside diameter as the heating section into the apparatus at the exit from the heating section and thereby provide a more positive and sharply defined cooling section. The section of low heat conductivity may extend through and define the entire cooling section or, if desired, it may consist of a tubular or other suitably shaped insert conforming on its inner surface with the shape and connecting the walls of the heating section and a cooling section. In the latter form the walls of the cooling section may be made of a material possessing a high or intermediate heat conductivity to facilitate dissipation of heat from the cork composition through the walls of the cooling section.

More specifically, we have found that the provision of a cooling section substantially insulated against the transfer of heat from the walls of the heating section through the walls of the cooling section to the cork passing through the cooling section brings about improvement in the strength and other characteristics of the product as well as other improvements in the operating results, not only as compared with the old practice wherein a forming tube composed entirely of a high or moderately high heat conductive material, such as copper or brass, was used, but also as compared with the results obtainable with the use of such a tube modified to include a section of low thermal conductivity at the feed end of the extrusion tube as disclosed in the aforesaid application Serial No. 316,721.

We have found further that when the cooling section is insulated from the heating section of the forming tube as disclosed herein and at the same time the feeding and forming section is insulated from the heating section in one of the ways disclosed in the aforesaid application Serial No. 316,721, the improvements in results and the operating economies are still further enhanced.

Among the objects and advantages of the present invention it is possible to cool the cork bar under pressure and at the same time more rapidly than when a tube or die composed of copper, brass or other material of high or intermediate heat conductivity, is used to define adjacent heating and cooling zones that are not insulated from one another.

Without the insulating section, it is necessary that the heating jacket be positioned some distance from the exit end of the tube section when using copper or other highly heat conductive material, and the rate of extrusion and the temperature in the heating zone must be kept lower to insure that the cork body will be sufficiently cooled when discharged from the tube. The present invention makes it possible to materially increase the extrusion rate as compared with the prior practices, including those operations carried on with the use of Bakelite or a similar low heat conductive insulating section in advance of the heating section to prevent transfer of heat from the heating section to the feeding and forming zone as disclosed in the aforesaid application Serial No. 316,721, but without similar heat insulation at the exit end of the heating section.

By introducing a section of low thermal conductivity to form the cooling zone or to insulate a cooling section from the heating section according to the present invention, and additionally insulating the forming section from the heating section, the heat losses are largely confined to those due to necessary loss of heat from the cork in cooling and at the same time regulation of the heat input is brought under relative easy and flexible control.

The present invention has the further advantage that it makes possible the positioning of the hot jacket adjacent the exit of the heating section, thus permitting the cork plug passing from the feeding and forming zone into the heating section to be brought up to the desired "cooking" temperature more slowly and uniformly. This is important when dealing with certain types of cork compositions.

By providing a cooling section insulated from the heating section it is also made possible to regulate the diameter of the extruded bar over a considerable range by varying the hot jacket temperature. This makes it possible not only to extrude to a given density but also to a given size, and thereby eliminates or minimizes bar shaving, an operation that has heretofore been a substantial element in manufacturing costs as well as a source of wastage of cork material.

Further objects and advantages of the present invention will be more fully disclosed as the description proceeds.

In the drawing:

Fig. 1 is a vertical sectional view of a typical form of apparatus embodying the present invention; and Fig. 2 is a vertical longitudinal section through a modification of the extrusion tube or die shown in Fig. 1.

The form of the invention chosen for purposes of illustration in Fig. 1 of the drawing is shown as embodied in an extrusion machine of the type disclosed and claimed in U. S. Patent No. 1,453,617, and consisting of an open-ended forming tube or die 2, a feeding hopper 4, a distributor 6, and a plunger 8. An opening 10 is provided in the upper wall of the tube 2 adjacent the hopper 4 through which the admixed comminuted cork and binder are fed from the hopper. The plunger 8 reciprocates in that portion of the forming tube adjacent and beneath the hopper 4 through a length of stroke that alternately brings the head of the plunger forward past the opening 10 and, in the rearward half of the stroke, withdraws the head of the plunger to the left of the opening 10, thereby permitting a fresh charge of cork to fall into the tube 2. In this way, the increments of freshly deposited cork are advanced and compressed against the previously formed cork body, at the same time advancing the cork body for a short distance.

As shown in Fig. 1, the extrusion die 2 is tubular in shape and consists of a feeding and forming section 12, a heating and curing section 14 and a cooling section 16. The forming section 12 and the heating and curing section 14 are shown as made of metal, which in the case of the heating and curing section 14 will usually be copper or another metal or alloy possessing high heat conductivity but may be brass or any other metal of similar intermediate heat conductivity. The forming section 12 may likewise be made of a highly heat conductive metal such as copper, or, if desired, it may be made of a metal of intermediate conductivity such as brass. The forming section 12 is shown as joined to the heating section by an insulating section 18 and couplings 20 made of reinforced Bakelite or other suitable material of low heat conductivity. Instead of using a metal tube section 12, as shown, for the forming section, this section may be made of any other material having a satisfactory coefficient of friction and other suitable properties, e. g., reinforced Bakelite, in which case the insulating section 18 may be omitted and the forming tube connected directly to the heating section as shown in Fig. 2.

In Fig. 1 the heating and curing section 14 is shown as surrounded by a steam jacket 22 and is joined at its discharge end to the cooling section 16 by a coupling 20 made of reinforced Bakelite. The cooling section 16 is shown likewise as made of reinforced Bakelite. It will be understood that wherever reinforced Bakelite is shown as used in the extrusion tube or die it may be replaced by another material possessing low heat conductivity and other suitable properties, such as strength, low coefficient of friction, etc.

In Fig. 2 the insulation of the cooling section 16 from the heating and curing section 14 is shown as effected by means of a short tubular insert 18 and couplings 20 formed of a material of low heat conductivity, e. g., reinforced Bakelite. The heating and curing section 14 is shown as made of copper and is surrounded by an electrically heated jacket 24. It will be understood that the heating means, whether a steam jacket, electrically heated jacket or other means, may be disposed in any desired position along the heating and curing section. By providing a heating unit that may be moved as desired along the heating section of the extrusion tube, it is made possible by changing the position of the heating element to vary the rate at which the cork is brought to the desired temperature in the heating zone, as well as to vary the length of the soaking or curing heat treatment; in other words, to vary the form of the curve representing the cork temperature as plotted against time or rate of travel of the cork mass through the heating and cooling zones, and in this way control and adjust the density and size of the cork bar more readily and precisely in the course of the extrusion process than has heretofore been practicable.

In Fig. 2 the feeding and forming section 12 is shown as made of reinforced Bakelite joined to the metal heating and curing section 14 by a coupling 20, likewise made of reinforced Bakelite. It will be understood that the feeding and forming section may be made of any material possessing the requisite strength, a satisfactory coefficient of friction, and resistance to heat, abrasion and chemical action of the binder constituents. It may even be a continuation of the tube forming the heating and curing section 14, in which case a water cooled jacket or other appropriate means must be provided for preventing transfer of heat from the heating section to the material in the feeding and forming section. However, it is preferable and increases the efficiency and capacity of the apparatus to construct the feeding and forming section according to the teaching of the aforesaid application Serial No. 316,721, and it is so shown in the drawing hereof.

In order to facilitate the withdrawal of heat and expedite cooling of the cork, a water cooled jacket 26 may be arranged in heat receiving relation to the cooling section 16 as shown in dotted lines on Fig. 2.

In the case where the extrusion die is a tube or other shape that may be made in circular form by known methods, the entire cross-section of the cooling section of the die may be made of material of low conductivity. Likewise in the case of the heat insulating section if this is used. However, in some cases, as where the composition cork is to be extruded in various more complicated shapes or in the form of strips of varying widths and thicknesses, it may be necessary to introduce other materials having higher heat conductivity to hold together the section of material of low heat conductivity. These may be arranged so as not to greatly alter the heat conductivity of the composite section so formed.

A reinforced Bakelite that has been found to work well for the purposes of the present invention is that formed from a Bakelite impregnated laminated fabric molded and finished to the desired dimensions. While reinforced Bakelite has been specified, it will be understood that various other materials may be used provided they have a low thermal conductivity and the requisite strength and, at the same time, may be threaded and coupled or otherwise secured to a tube section of copper, brass or other relatively highly heat conductive material. Examples of such other materials are various plastics, e. g., pyroxylin, and urea resins, laminated for increased strength and low heat conductivity purposes with asbestos, cloth, paper or various other fibrous materials. These materials give exceptionally low values for heat conductivity, varying from $K=0.05$ to $0.30$.

In addition to materials of extremely low thermal conductivity such as above mentioned, there are various metals and alloys that possess low thermal conductivity and which are deemed to be included within the class of materials having "low thermal conductivity" as defined herein. Among these are the type of stainless steel known as "18-8" (18% Cr, 8% Ni), various nickel-chromium-iron alloys, e. g., the alloy containing 68% Ni, 12% Cr and 26% Fe, and Constantan (60% Cu, 40% Ni), all with thermal conductivity values for the constant K of from 10 to 15.

Materials of "high thermal conductivity," as this term is used herein, are copper, $K=218$; silver, $K=238$; aluminum, $K=119$, and other suitable materials having a thermal conductivity of around $K=90$ or more.

The constant values, K, for "thermal conductivity" of the various materials referred to herein are expressed in B. t. u. per hour for one square foot and a temperature difference per foot of one degree F.

It is to be understood that the invention is not predicated upon the use of a particular material but rather involves the use in the association described of two materials of such differing thermal conductivities as to make it possible to secure a high rate of heat input and prolongation of the heat treatment, with the desired advantages hereinbefore stated, while insuring cooling of the composition cork by the time it discharges from the cooling section to a point where it will not unduly expand or become distorted in shape on further cooling and aging when removed from the extrusion tube.

When the tube section of low thermal conductivity does not extend throughout the cooling section, as shown for example in Fig. 2, it will be understood that the length of this section will be so regulated with respect to the thermal conductivity of the material constituting such section and to the rate of heat input and thermal conductivity of the material of the walls of the heating section as to effect the desired blocking off of heat transfer along the walls of the forming tube from the heating section through the walls of the cooling section to the cork composition disposed in the cooling section. As shown in the drawing, this tube section of low thermal conductivity may be relatively short but nevertheless of substantial length usually at least greater than the diameter of the forming tube.

It is to be understood that where the expression "forming tube" has been used in the claims it is to include not only those extrusion dies or passages that are tubular in shape but also dies of other shapes including those required in extruding cork in slabs and strips.

Various changes in the form and mode of application of the invention will suggest themselves to the worker skilled in the art, and, therefore, the invention is not to be deemed as limited except as indicated by the language of the appended claims.

We claim:

1. In an apparatus for extruding composition cork, a forming tube through which comminuted cork and a binder are forced and bonded together by heat and pressure, comprising a forming section, a heating section and a cooling section, said cooling section consisting at least in part of a tube section positioned at the exit end of said heating section, and defining at least in part the path of travel of the cork from said heating section to the exit from said forming tube, said tube section being of a length greater than the diameter thereof and of such low thermal conductivity as to substantially prevent transfer of heat along the walls of the heating section to the cork in the cooling section in the course of a normal extrustion operation.

2. In an apparatus for extruding composition cork, a forming tube through which comminuted cork and a binder are forced and bonded together by heat and pressure, comprising a forming section, a heating section and a cooling section, the walls of said heating section being composed of a material having a high thermal conductivity, said cooling section consisting at least in part of a tube section positioned at the exit end of said heating section, and defining at least in part the path of travel of the cork from said heating section to the exit from said forming tube, said tube section being of a length greater than the diameter thereof and of such low thermal conductivity as to substantially prevent transfer of heat along the walls of the heating section to the cork in the cooling section in the course of a normal extrusion operation.

3. In an apparatus for extruding composition cork, a forming tube through which comminuted cork and a binder are forced and bonded together by heat and pressure, comprising a forming section, a heating section and a cooling section, said cooling section consisting in part of a tube section interposed in the walls of said forming tube at the exit end of said heating section and defining in part the path of travel of the cork from said heating section to the exit from said forming tube, and said tube section being of a length greater than the diameter thereof and of such low thermal conductivity as to substantially prevent transfer of heat along the walls of the heating section to the cork in the cooling section in the course of a normal extrusion operation.

4. In an apparatus for extruding composition cork, a forming tube through which comminuted cork and a binder are forced and bonded together by heat and pressure, comprising a forming section, a heating section and a cooling section, the walls of said heating section being composed of a material having a high thermal conductivity, said cooling section consisting in part of a tube section interposed in the walls of said forming tube at the exit end of said heating section and defining in part the path of travel of the cork from said heating section to the exit from said forming tube, and said tube section being of a length greater than the diameter thereof and of such low thermal conductivity as to substantially prevent transfer of heat along the walls of the heating section to the cork in the cooling section in the course of a normal extrusion operation.

5. In an apparatus for extruding composition cork, a forming tube or die through which comminuted cork and a binder are forced and bonded together by heat and pressure comprising a forming section, a heating section and a cooling section, the walls of said heating section being composed of a material having a high thermal conductivity, and said cooling section consisting in part of a tube section composed of material having at least a moderately high thermal conductivity and in part of a tube section composed of material of low thermal conductivity, said tube section of low thermal conductivity being interposed between said tube section of at least moderately high thermal conductivity and said heating section and in contiguous relation thereo, and said tube section of low thermal conductivity being of a length greater than the diameter thereof and of such low thermal conductivity as to substantially prevent transfer of heat along the walls of the heating section to the cork in the cooling section thereof, and means for accelerating withdrawal of heat through the walls of the cooling section comprising a water-cooled jacket surrounding and in heat receiving relation to said cooling section.

6. In an apparatus for extruding composition cork, a forming tube or die through which comminuted cork and a binder are forced and bonded together by the action of heat and pressure, said forming tube comprising a forming section, a heating section and a cooling section, the walls of said heating section being composed of a material of high thermal conductivity, tube sections interposed in the walls of said forming tube at each end of said heating section and, respectively, defining a part of said forming section and a part of said cooling section, and said tube sections being of a length greater than the diameter thereof and having such low thermal conductivity as to substantially prevent transfer of heat along the walls of the extrusion passage defined by said several sections from the heating section to cork disposed in the forming and cooling sections, respectively, in the course of a normal extrusion operation.

7. In an apparatus for extruding composition cork, a forming tube or die through which comminuted cork and a binder are forced and bonded together by the action of heat and pressure, said forming tube comprising a forming section, a heating section and a cooling section, the walls of said heating section being composed of a material of high thermal conductivity, tube sections interposed in the walls of said forming tube at each end of said heating section and, respectively, defining a part of said forming section and a part of said cooling section, and said tube sections being of a length greater than the diameter thereof and of such low thermal conductivity as to substantially prevent transfer of heat along the walls of the extrusion passage defined by said several sections from the heating section to cork disposed in the forming and cooling sections in the course of a normal extrusion operation, and said cooling section also comprising a second tube section composed of a material of relatively high heat conductivity whereby to accelerate the withdrawal of heat from the composition cork passing therethrough.

8. In an apparatus for extruding composition cork, a forming tube or die through which comminuted cork and a binder are forced and bonded together by the action of heat and pressure, said tube comprising a forming section, a heating section and a cooling section, the walls of said heating section being composed of a material of high thermal conductivity, tube sections interposed in the walls of said forming tube at each end of said heating section and disposed contiguous to and continuous with the walls of said heating section, and, respectively, defining a part of said forming section and a part of said cooling section, and said tube sections being of a length greater than the diameter thereof and of such low thermal conductivity as to substantially prevent transfer of heat along the walls of the extrusion passage defined by said several sections from the heating section to cork disposed in the forming and cooling sections thereof in the course of a normal extrusion operation, and said cooling section being provided with means accelerating the withdrawal of heat from the composition cork passing therethrough.

9. In an apparatus for extruding composition cork, a forming tube or die through which comminuted cork and a binder are forced and bonded together by the action of heat and pressure, said forming tube comprising a forming section, a heating section and a cooling section, the walls of said heating section being composed of a material of high thermal conductivity, and said forming and cooling sections each including a tube section composed of a material of high thermal conductivity, tube sections interposed in and continuous with the walls of said forming tube at each end of the heating section and, respectively, forming a part of said forming section and a part of said cooling section, and said tube sections being of a length greater than the diameter thereof and of such low thermal conductivity as to substantially prevent transfer of heat along the walls of the extrusion passage defined by said several sections from the heating section to cork disposed in the forming and cooling sections thereof in the course of a normal extrusion operation.

10. In an apparatus for extruding composition cork, a forming tube or die through which comminuted cork and a binder are forced and bonded together by the action of heat and pressure, said tube comprising a forming section, a heating section and a cooling section, the walls of said heating section being composed of a material of high heat conductivity, and the walls of said cooling section being composed substantially of a material of low thermal conductivity.

11. In an apparatus for extruding composition cork, a forming tube or die through which comminuted cork and a binder are forced and bonded together by the action of heat and pressure, said tube comprising a forming section, a heating section and a cooling section, the walls of said heating section being composed of a material of high heat conductivity and the walls of said forming and cooling sections being composed of a material of relatively low heat conductivity.

AMBROSE H. PENDERGRAST.
ARNETT E. BENTON.